United States Patent [19]

von Bonin

[11] Patent Number: 5,053,148
[45] Date of Patent: Oct. 1, 1991

[54] HEAT RESISTANT FOAMS, THEIR PREPARATION AND USE

[75] Inventor: Wulf von Bonin, Odenthal, Fed. Rep. of Germany

[73] Assignee: Bayer Aktiengesellschaft, Leverkusen, Fed. Rep. of Germany

[21] Appl. No.: 504,360

[22] Filed: Apr. 3, 1990

[30] Foreign Application Priority Data

Apr. 17, 1989 [DE] Fed. Rep. of Germany ....... 3912552

[51] Int. Cl.$^5$ .............................................. A62D 1/00
[52] U.S. Cl. ...................................... 252/8.05; 252/3; 252/602; 252/606; 252/609; 106/18.18; 106/122
[58] Field of Search ................... 252/606, 602, 609, 3, 252/8.05; 106/18.18, 122

[56] References Cited

U.S. PATENT DOCUMENTS

| | | | |
|---|---|---|---|
| 4,056,588 | 11/1977 | Baniel | 264/63 |
| 4,133,823 | 1/1979 | Joyce, III et al. | 260/439 R |
| 4,206,133 | 6/1980 | Joyce, III et al. | 260/429.7 |
| 4,313,761 | 2/1982 | Joyce, III et al. | 106/18.19 |
| 4,446,061 | 5/1984 | Joyce, III et al. | 252/602 |
| 4,818,732 | 4/1989 | Fox et al. | 501/81 |

FOREIGN PATENT DOCUMENTS 3128603 11/1977 Fed. Rep. of Germany .

OTHER PUBLICATIONS

Chemical Abstracts vol. 83, No. 18, 11/2/75, Columbus, Ohio, U.S.A., p. 269, Reference No. 151375R & JP-A-7526810 (Nippon Chemical Industrial Co), 19-0-3-1975.
Chemical Abstract, vol. 85, No. 3, Columbus Ohio, U.S.A. & JP-A-50028420 (Tadka Dyestuffs Mfg. Co.), 16-09-1975, Ref. No. 21608Z.
Chemical Abstracts vol. 89, 1978 Columbus, Oh., U.S.A., B. V. Shchetanov et al., "Strengthening of Phosphate Foam Ceramics with silicon carbide whiskers", Mekh. Polim. 1978 (2), 253–256, p. 305, Ref. No. 134381w.

Primary Examiner—Robert L. Stoll
Assistant Examiner—N. Bhat
Attorney, Agent, or Firm—Sprung Horn Kramer & Woods

[57] ABSTRACT

Novel heat resistant foams can be obtained by heating metal phosphonates or metal phosphonate precursors to temperatures of above 200° C. They may for example be used as electrical and/or heat insulation materials, in the production of mouldings, as a cavity filler, as carriers for active ingredients and/or as fillers with low bulk densities.

12 Claims, No Drawings

HEAT RESISTANT FOAMS, THEIR PREPARATION AND USE

Heat resistant foams are understood to mean those foams which can be used at temperatures above 500° C.

Known heat resistant foams have a substantially inorganic framework, for example based on asbestos, gypsum or silicate glasses (cf. e.g. DE-OS (German Published Specifications) 2,214,609, 2,227,608 and 2,232,136). Foams of this type are brittle and can virtually not be produced and manipulated at bulk densities of less than 200 kg/m: Their production, in particular the production of foamed glasses with low bulk density and fine pores, is expensive.

The production on an industrial scale of foams made from metal phosphates is not known.

Now, novel heat resistant foams have been found, which are characterized in that they are obtainable by heating metal phosphonates or metal phosphonate precursors to temperatures above 200° C.

For example, temperatures above 400° C, preferably those from 500° to 800° C. and in particular those from 550° to 750° C. can be used for producing heat resistant foams according to the invention.

Suitable metal phosphonates are for example phosphonates of metals of main groups and subgroups II and III of the periodic table of the elements. Magnesium phosphonates, calcium phosphonates and aluminium phosphonates are preferred.

The phosphonate radicals can for example be those which contain organic radicals bonded directly to phosphorus atoms. Suitable phosphonate precursors are for example phosphonic acid derivatives such as halides, amides, esters and non-metallic salts in combination with metal compounds which contain an anionic component which is detachable at elevated temperatures, for example oxides, hydroxides, carbonates, silicates, borates, alkylates or salts of volatile acids, such as carbaminates, formates, acetates, chlorides or nitrates. Non-metallic salts of phosphonic acids are for example ammonium salts and amine salts. The metal compounds mentioned are preferably those of metals of main and subgroups II and III of the periodic table of the elements. Magnesium compounds, calcium compounds and aluminium compounds are preferred. The halides, amides, esters and/or non-metal salts of phosphonic acids and the metal compounds which contain an anionic component which is detachable at elevated temperature may contain these two components in any desired ratios. For example, the phosphonic acid derivative may be present in a molar amount which is 0.1 to 10 times the amount theoretically required for giving rise to one of the phosphonates specified below of the formulae (I) to (III).

Suitable metal phosphonates are for example those which correspond to the idealised formulae (I) to (III)

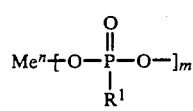  (I)

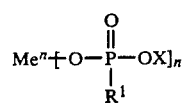  (II)

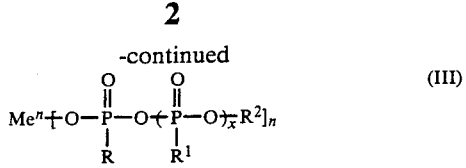

in which in each case
Me represents a metal,
n represents the valency of the metal Me,
m represents n/2,
R, $R^1$ and $R^2$ each independently of one another represent an organic radical having 1 to 18 carbon atoms,
X represents hydrogen, ammonium, alkyl ammonium or one equivalent of a metal and
x represents zero or an integer from 1 to 20.

Preferably,
Me represents a metal of main or subgroups II or III of the periodic table of the elements,
R, $R^1$ and $R^2$ each independently of one another represent an aliphatic, aromatic, araliphatic or heterocyclic radical, in particular represent a $C_1$ to $C_6$-alkyl radical,
X represents hydrogen, ammonium or a monovalent metal and
x represents zero or an integer from 1 to 6.

Particularly preferably,
Me represents magnesium, calcium or aluminium,
R, $R^1$ and $R^2$ each independently of one another represent methyl, ethyl, propyl, butyl, cyclohexyl or phenyl and most particularly preferably represent methyl,
X represents hydrogen, ammonium, sodium or potassium and
x represents zero.

In principle, the preparation of metal phosphonates is known. For this purpose, for example free phosphonic acids or phosphonic acid chlorides can be reacted with the corresponding metal hydroxides, it being possible to operate in an aqueous medium or in the absence of water. A novel preparative process for metal phosphonates is of particular interest, in which a metal oxide or metal hydroxide is reacted in an aqueous medium with alkyl alkylphosphonates, for example dimethyl methylphosphonate, at temperatures of up to 200° C. In this operation, it is also possible to use excesses over the stoichiometrically required amounts, for example up to 2 equivalents of phosphonic acid ester to 1 equivalent of metal oxide or metal hydroxide. For example, in the case of the use of one mol of calcium oxide, 2 to 3 moles of the phosphonic acid and/or its ester can be used or in the preferred case of the use of aluminium hydroxide, 2 to 4, in particular 3 moles of the phosphonic acid and/or its ester can be used per mol of aluminium hydroxide.

Of particular interest are aluminium phosphonates which correspond to the following idealized formula (IV)

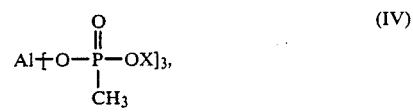  (IV)

in which
X represents hydrogen, ammonium, methyl, ethyl or alkyl ammonium

Alkylammonium can for example be a primary, secondary or tertiary alkylammonium, such as methylammonium, dimethylammonium, ethanolammonium, triethanolammonium or ammonium groups which are derived from urea, melamine, urazole or other basic-reacting derivatives of cyanuric acid.

It is also possible to prepare suitable metal phosphonates by reacting for example metal hydroxides in which the metal has the valency $n=2$ or 3 with $n-1$ to $n+1$, preferably n moles of phosphonic acid or phosphonic acid ester in a medium free from water, if desired with the addition of a suspending agent, with each other at temperatures from 100° to 300° C., in particular from 150° to 250° C.

The preparation of metal phosphonates can be carried out in the presence of amines, for example melamine or ammonia. It is not necessary to employ stoichiometric amounts of the latter materials, but it is generally advantageous not to exceed the amount of n moles.

Prior to foaming, the metal phosphonates may be present in solution, in (preferably aqueous) suspension, as a powder, in granules or in the form of prefabricated mouldings.

In foaming, it is possible to use metal phosphonates as individual compounds or precursors thereof as individual component mixture (of phosphonic acid derivative and metal compound). Any desired mixtures of metal phosphonates and/or precursors of metal phosphonates can likewise be employed.

Prior to or during the foaming process the metal the invention may have fillers added to them, for example in the form of fibers, platelets, crystals, whiskers, powders or hollow or solid beads. These may for example be composed of chalks, dolomites, rock powders, kaolins, other silicates, aluminosilicates, graphites, micas, vermiculites, perlites, carbon black, asbestos, silicas, quartz, metal, gypsum, glasses, ashes, additives imparting ceramic properties, enamel frits, glass frits, base compositions for chinas, glasses or pottery, aluminium oxides, borates, titanium dioxide or carbides, silicides or nitrides having ceramic properties. Additions of organic fillers are also possible. Pulverulent fillers are preferred, made from alkaline-earth metal carbonates, iron oxides, glasses (also in the form of beads), wollastonite and other silicates. Oxides and hydroxides of aluminium are particularly preferred.

In a particular embodiment of the invention, expandable additives are used, for example expandable graphite, expandable borates, silicates and/or borosilicates, expandable micas, vermiculites and/or perlites. Additives of this type may for example be present in amounts of 5 to 95% by weight, relative to the total foam. Expandable graphites are particularly preferred in this embodiment.

The fillers and additives can be used individually or in any desired mixtures with one another.

In another preferred embodiment of the invention, the metal phosphonates and/or the precursors of metal phosphonates and if desired fillers and additives are applied from solution or dispersion, if desired with the assistance of binders, to surfaces and are then subjected to the foaming process in the form of a coating.

The metal phosphonates and/or their precursors and if desired fillers and additives can also be processed to form mouldings, for example by press moulding and can then be foamed in this form. It is also possible to impregnate absorbent substrates, for example mineral wool webs or foams, with solutions or dispersions of metal phosphonates and/or their precursors and if desired fillers and additives, and then carry out the foaming operation, during which the matrix may undergo carbonization.

The foaming operation itself can be carried out in various ways, for example by free-forming, by powder or granules heating in the open, in a fluidized bed or in bulk or as an exposed coating. The foaming operation can also be carried out in open or closed moulds. In closed moulds, the foaming operation can if desired be carried out with compaction and/or with the formation of compacted or adhesively supported outer layers and smooth surfaces.

The foaming operation according to the invention is carried out in such a way that the metal phosphonates and/or their precursors and if desired additives and fillers are heated to temperatures above 200° C. The heating operation can be carried out in the presence of air or in an atmosphere of inert gases, such as nitrogen or carbon dioxide. It is possible to heat at reduced, normal or elevated pressure. The heating operation can for example be carried out with a flame, a stream of hot gas, by superheated steam, by heat conduction, by ultrasound, by radiation or by high frequency or microwave heating.

The achievable bulk densities of the foams below 100 $kg/m^3$, often below 10 $kg/m^3$. At low foaming temperatures or when foaming with compaction, it is also possible to obtain higher bulk densities, for example those in the range of from 100 to 500 $kg/m^3$ and above. In general, the bulk densities are lower the faster heat is supplied to the metal phosphonate particles and the closer the foaming temperature is to 600°-700° C.

In general, the foams which are formed have a mixed open-and closed-cell character, and the cell walls generally have glass-like properties. The foams according to the invention are generally brittle, but have however a certain ductile to flexible character at bulk densities below 100 $kg/m^3$. Their compressive strengths are generally in the range between 0.01 and 10 MPa, it also being possible for very light grades to have still lower values.

In the foaming process, the metal phosphonate generally passes through a viscous melt phase, as a result of which the individual particles are bonded to one another and form a homogeneous foam framework Water-soluble phosphonate formulations generally lose their water solubility in the foaming process, particularly above 500° C. During the foaming operation, gaseous substances are generally evolved. It is therefore advantageous when operating in closed moulds to provide exhaust openings for these gases and for the air which they displace. When foaming in closed moulds, pressures up to 60 bar and above can occur. Closed moulds should therefore be designed with adequate strength.

The adhesion of the foams to the mould walls, which for example may be composed of metal or ceramic materials, is generally good and often greater than the it is accordingly advantageous to operate with release agents. Suitable release agents are for example layers of organic paints, sugar, polyvinyl acetate dispersions, polymer films, fabrics, non-woven fabrics or paper, which then form layers of carbon in the foaming operation, or else layers of aluminium foil, graphite, talc, aluminium oxide or silica.

The foams according to the invention may for example be used for producing mouldings as electrical and/or heat insulating materials, as fire-stops, as cavity fillers, as carriers for active ingredients and/or as fillers or building materials having low bulk densities, and for the production of coatings on glass which expand and become opaque when given flame treatment.

The foaming reaction of the metal phosphonates and/or their precursors can also be used to expand or render porous other substrates, particularly those softening at temperatures between 300° and 700° C. Such substrates, for example thermoplastic polymers or plastics such as aromatic polyesters, polyethers, polysulfides, polyamides, polycarbonates, polyimides, polysiloxanes or polyphosphazenes, can be introduced into the foaming operation as a mixture with metal phosphonates and/or their precursors.

With the aid of the foams according to the invention, it is possible for example to insulate hot pipes, by filling the hollow space between two concentric pipes with foam, by introducing into the said hollow space granules or coatings which are made from formulations of the metal phosphonates and/or their precursors, then heating the material and in this way bringing about foaming. It is also possible with the foams according to the invention to produce coated papers, ceramic surfaces or metal surfaces or grids, and to use these for example in fire doors, fire protective seals, fire protective gas barriers or other fire protection devices. By expanding powders or granules of the metal phosphonates in a stream of hot gas or in a flame, it is possible to produce ultralight insulating fillers, which can be used for loose insulating fills. By expanding between two metal or ceramic surfaces or other mouldings, it is possible to produce sandwiches, insulating half-shells or other desired mouldings. If the foaming operation is not carried out at sufficiently high temperatures, foam components with elevated bulk densities can be produced, which have a tendency to further expansion for example when freshly heated or when given flame treatment and can in this way act as an additional fire protection, for example at cable duct openings or other points of penetration in fire walls.

Combinations of the metal phosphonates and/or their precursors with other expandable and heat resistant components, for example expandable graphites, perlites, vermiculites, borates or borosilicates, can lead to interesting foams which can be used for insulation purposes. With these combinations it is often advantageous that, at temperatures at which the additive components are expanded, but do not have any mutually adhesive properties, the expanding metal phosphonates function as a viscous expanding melt, and in this way can impart mutual adhesion to the expanded additive particles.

In the case of the particularly interesting combination with expandable graphites, in particular with $NO_x$ or $SO_x$ expandable graphites, the foams which can be obtained in this manner are surprisingly effectively protected against oxidative degradation. This is particularly advantageous, because in this way the particularly high heat resistance of the expandable graphite foams which are susceptible to oxidation can be combined with the oxidation resistance of the metal phosphonate foams. Expandable combinations of this type may contain between 5 and 95% by weight, preferably between 15 and 60% by weight of the metal phosphonates and/or their precursors.

The foams according to the invention may also be used in motor construction, fireplace construction, in exhaust insulation sleeves, exterior wall panels, cavity fillers, fire protection components, roof slabs, rocket construction, shuttle construction, combustion chambers, melting furnace constructions, as carriers for active ingredients, sound absorbing components, energy-absorbing elements, coatings with a fire protective character and as binders for expandable graphites, vermiculites and aluminium hydroxides for fire protection equipment and fire protective laminates.

The particle size in which the metal phosphonates and/or their precursors are present before foaming is not a critical quantity for foamability. This particle size can for example be above 2 $\mu$m, and is preferably between 5 and 500 $\mu$m.

The foams according to the invention are distinguished by being able to have very low bulk densities and are dimensionally stable up to about 800° C. (if desired, also at still higher temperatures). They are simple to produce, and the possibility of variation with regard to the qualitative and quantitative composition of the said foams is very great.

It is decidedly surprising to observe that in accordance with the invention, in a very simple technical manner, it is possible to obtain very high quality, heat resistant, oxidation resistance foams using phosphonates, bearing in mind that this is not possible with metal phosphates.

EXAMPLES

Preparation of phosphonates

Example A 1 mol of calcium chloride was dissolved in 6 moles of dimethyl methylphosphonate (DMMP) with stirring. The temperature was increased to 200° C. with stirring and maintained at this temperature for 1 hour. During this procedure, the formation of calcium phosphonate occurred with the elimination of methyl chloride, and at the same time excess DMMP was distilled off. The mixture was still maintained at 200° C. and freed from residual DMMP in vacuo with the aid of a water jet pump. A glass-like, pulverisable, water-soluble material was obtained.

Example B

The procedure followed in Example A was repeated, but instead of calcium chloride, zinc chloride was used. Likewise, a glass-like, brittle material was obtained.

Example C 2.2 mol of methylphosphonic acid were added to 1 mol of magnesium hydroxide in a 20% strength aqueous suspension, and the mixture was stirred at 95° C. until a solution was obtained. The mixture was then evaporated to dryness in vacuo with the aid of a water jet pump. A non-hygroscopic powder was obtained.

Example D 1 mol of aluminium hydroxide (Apyral ® B 90 supplied by Bayer AG) was suspended in 19 mol of water and 3 mol of dimethyl methylphosphonate and heated with stirring in an enamel autoclave for 5 hours at 190° C. After cooling, a clear, slightly viscous solution was obtained with a solids content, determined gravimetrically of 44% by weight. Although this solution can be used further as such, it can also be evaporated to dryness at 120° C., then resulting in a non-hygroscopic material which is glass-like at room temperature.

Example E

The procedure followed in Example D was repeated, but heating was carried out for 5 hours at 150° C. A fine-particle suspension was obtained having a solids content, determined gravimetrically, of 48% by weight, this suspension being usable as such. It is also possible to isolate the solid contained therein by centrifugation and drying at 120° C., as a non-hygroscopic powder. According to spectral data, this still contains methyl ester groups.

Example F

The procedure followed in Example E was repeated, but with the additional use of 1 mol of melamine. An easily filterable suspension was obtained. The solid was filtered off and dried at 120° C. At room temperature, the separated aqueous phase contained less than 2% by weight of solid in dissolved form.

Example G 234 parts by weight of aluminium hydroxide (the same grade as in Example D) were heated with 93 parts of melamine and 750 parts of dimethyl methylphosphonate in a paddle drier with beating rods for 3 hours at 160° C., then for 2 hours at 180° C. and then for 2 hours at 210° C., dimethyl ether and some methanol being distilled off during this procedure. After cooling, the phosphonate salt formed was obtained as a colourless powder.

EXAMPLES ACCORDING TO THE INVENTION

Example 1

0.5 g of each of the phosphonates prepared according to Examples A to G was pressed in a pill press to pills of 3 mm diameter. These pills were introduced on a china dish to an oven preheated to 600° C. After 30 minutes, the dishes were removed from the oven.

In every case, a "cauliflower-like", fine-cell foamed article resulted. The following bulk densities were determined:

Phosphonate from Example A: 0.009 g/cm$^3$
Phosphonate from Example B: 0.015 g/cm$^3$
Phosphonate from Example C: 0.086 g/cm$^3$
Phosphonate from Example G: 0.029 g/cm$^3$
Phosphonate from Example E: 0.003 g/cm$^3$
Phosphonate from Example F: 0.008 g/cm$^3$ In every case, the powdered material was no longer water-soluble after being expanded.

Example 2

The procedure followed in Example 1 was repeated, but the pills were placed in the cold oven and this was then heated to 700° C. in the course of 1.5 hours. The contents were allowed to remain for 15 minutes at this temperature, and then the samples were removed. Here also, in every case, a "cauliflower-like", fine-cell foamed article resulted, whose bulk densities were however about 25% higher than in Example 1.

Example 3

Pills 0.5 g in weight were pressed from the phosphonate from Example D. These pills were introduced on an iron tray into an oven preheated to a different temperature in each case and allowed to remain in the oven for 30 minutes. After cooling of the samples, the following bulk densities were determined:

| Temperature °C. | Bulk density kg/m$^3$ |
| --- | --- |
| 300 | hardly any expansion |
| 400 | 680 |
| 500 | 550 |
| 600 | 10 |
| 700 | 5 |
| 800 | 9 |

In all cases above 500° C. the foams had fine-cell, homogeneous character.

Example 4

Equal parts by weight of non-expanded vermiculite and phosphonate, prepared according to Example C, were mixed, both components having particle size diameters of about 2 mm. 20 g of this mixture were added to a paperlined cylindrical mould 200 ml in volume, consisting of 2 steel half-shells. The mould was introduced in the horizontal position into an oven heated to 600° C. and allowed to remain there for 30 minutes. The mould was then taken out, cooled and opened. A compact, stable foam with good mechanical cohesion was obtained, and which had a compressive strength of 0.9 MPa and a bulk density of 0.09 g/cm$^3$.

Example 5

The following were in each case granulated with the addition of some water, which was subsequently removed again by drying:
 a) expandable graphite powder (Sigraflex ® FR),
 b) a mixture of expandable graphite powder and the phosphonate from Example D, which contained 25% by weight of phosphonate,
 c) a mixture of expandable graphite powder and the phosphonate from Example D, which contained 50% by weight of phosphonate,
 d) a mixture of expanded graphite powder and the phosphonate from Example D, which contained 75% by weight of phosphonate and
 e) phosphonate from Example D.

Each of these five formulations were introduced in an amount of 20 g to the cylindrical mould used also in Example 4 and expanded at 600° C.

Foam cylinders of homogeneous nature were obtained in every case. The cylinder (made from granules a)) not containing phosphonate was however less mechanically robust and had a tendency to crumble when sectioned. The cylinders containing phosphonate (made from granules b) to e)) were mechanically more robust, because the phosphonate had acted as an expanding binder.

From each of the five cylinders, a 2 cm thick slice was cut. These slices were introduced into a muffle furnace, standing upright on edge and were heated there with the admission of air to 700° C. After 7 hours, the contents of the oven were cooled. The following characteristics were observed when assessing the slices:
 a) hollow interior, mechanically very weak, disintegration on touching,
 b) attacked to a depth of 0.5 to 1 mm, the surface slightly affected mechanically, reduced indentation resistance,
 c) to e) unaltered internally and externally, and mechanically strong.

This shows the good binding properties imparted by metal phosphonates and the stabilization towards oxidation.

Example 6

100 parts by weight of the phosphonate solution obtained according to Example D were in each case admixed with stirring for 3 hours at room temperature with 50 parts of different fillers having an average particle diameter of 1.2 to 12 μm. The mixture was then dried, comminuted, pressed into pills of 1 g in weight and freely expanded analogously with Example 1. After expansion, the following bulk densities were determined on the foams obtained in each case:

| Filler | Bulk density g/cm$^3$ |
| --- | --- |
| Glass microspheres | 0.06 |
| Aluminium hydroxide | 0.02 |
| Wollastonite | 0.09 |
| Kaolin | 0.22 |
| Colemanite | 0.03 |
| Fe$_2$O$_3$ | 0.38 |
| Wood flour | 0.10 |
| Magnesium hydroxide | 0.02 |
| Aluminium oxide | 0.39 |
| Titanium dioxide | 0.40 |
| Nickel powder | 0.68 |

Example 7

The phosphonate solution obtained according to Example D was concentrated by the addition of the solid obtained according to Example E to form a fine-particle suspension having a solids content of 66% by weight, and used for the internal coating of an iron pipe having an internal diameter of 5 cm. After drying, it was determined by weighing that 14 g of phosphonate had been applied as a coating per 10 cm length of pipe. A second iron pipe with an external diameter of 2.2 cm was inserted axially into the coated pipe and centered. The double walled pipe formed in this manner was heated in an oven for 30 minutes at 600° C. After cooling, the cavity between the two pipes was filled with fine-cell phosphonate foam. Pipes of this type can be used as exhaust insulation sleeves in motor construction.

Example 8

The phosphonate prepared according to Example F was ground in a ball mill to a particle size of about 100 μm and introduced between two steel sheets (each of thickness 0.2 mm) to a thickness of 4 mm. This pack was introduced into a graphite block provided with a slit, which block allowed expansion of the pack to a maximum of 2 cm, and the assembly was heated at 600° C. for 30 minutes. After cooling, a sheet steel sandwich 2 cm in depth filled with phosphonate foam was taken from the separable graphite block. The adhesion between the sheet steel and the foam core was so good that in all tensile and shear tests, the adhesion between the steel and the foam moulding could not be broken, without destroying the foam core.

Example 9

A 1 mm thick steel plate was coated with a solution of the phosphonate from Example D which had been concentrated to a solids content of 70%, and the plate was dried at 80° C. A clear, non-crystallising, paint film 0.5 mm in thickness was formed. The steel plate which had been prepared in this manner was treated on the reverse side with a natural-gas burner so that in 3 minutes the temperature of the steel plate reached 700° C. On the side not exposed to the flame, the coating expanded to form a very fine-cell insulating foam. This prevented the heat transfer to such an extent that at a foam thickness of 6 mm, the surface temperature measured by non-contact means still remained below 300° C. after 10 minutes.

Example 10

100 parts by weight of the phosphonate solution obtained according to Example D, 50 parts by weight of the phosphonate obtained according to Example G and 50 parts by weight of expandable graphite (Sigraflex ® FR) were admixed with stirring to form a spreadable paste. A strip of sheet steel 0.3 mm in thickness and 1.5 cm in width was coated with this paste. After drying the strip at 120° C., the layer thickness of the paste was 2 mm. During flame treatment with a natural-gas burner of the sealing strip prepared in this manner, the coating expanded by some 100% by volume, without the expandable graphite being blown off into the flame to a significant extent. Strips of this type can be used for sealing fire doors and safes against attack by fire.

Example 11

2 mol of the ammonium salt of methylphosphonic acid and 2.5 mol of chalk were intimately mixed in powder form. 0.2 g pills were pressed from this mixture on a pill press. These were introduced into a preheated oven at 600° C. and expanded to form a fine-cell phosphonate foam having a bulk density of 0.28 g/cm$^3$.

55 g of these pills were processed according to Example 4 to form a foam cylinder, which had a bulk density of 0.27 g/cm$^3$.

Both foams can be used as heat insulation material.

Example 12

Bonded webs of glass, polyacrylonitrile fibers, cotton and kaolin fibers, and steel wool were fully saturated with the aqueous solution of the phosphonate obtained according to Example D, and squeezed off. Each web was then dried at 120° C. At this temperature, these webs were still flexible and could be rolled and shaped. The webs were wrapped around a pipe at 80° to 100° C. After cooling and removing the inner pipe, a dimensionally stable tubular component was obtained from the thermoplastic combination material. These tubular components expanded when heated at 700° C. and when given flame treatment by 100 to 300% by volume in each case. In this operation, a fibre-reinforced foam material was obtained, even when using organic fibre materials. Tubular sleeves of this type can be used as cable ducting through fire walls, where in the event of a fire they are effective against the penetration of fire, by virtue of sealing all cracks with the formation of a fire-resistant foam.

A 1 cm$^3$ piece of each of the webs which had been treated as described and dried, were placed in an oven and heated in the course of 50 minutes from room temperature to 800° C. and then removed from the oven. In every case, an increase in volume of more than 100% was observed.

Comparable results were obtained when a flexible polyurethane foam was used instead of a web.

Example 13

A sheet of window glass was coated with the phosphonate solution D, which had previously been filtered clear, so that a dry, glass-like film of about 0.8 mm in thickness resulted on the glass surface. The glass sheet which had been coated in this manner was incorporated with the coating facing inwards into a double-walled insulating glass assembly with an air gap.

After 3000 hours of exposure to light in a weatherometer the internal film did not lose its properties of transparency and colorlessness.

The insulating glass was subsequently given flame treatment externally with a burner flame. At the position exposed to the flame a whitish, radiation reflecting, fine-cell foam was formed, which considerably hindered the transfer of heat and radiation.

What is claimed is:

1. Heat resistant foams obtained by heating metal phosphonates or metal phosphonate precursors to temperatures above 200° C.

2. A foam of claim 1, in which the metal phosphonate is of a metal selected from the group consisting of groups II, IIA, IIIA and IIIB of the periodic table of the elements.

3. A foam of claim 1, in which the metal phosphonate precursor is a combination of a phosphonic acid derivative with a metal compound which contains an anionic component which is detachable at elevated temperatures.

4. A foam of claim 1, in which the metal phosphonate corresponds to the idealised formulae (I) to (III)

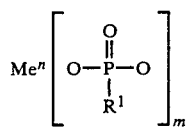

(I)

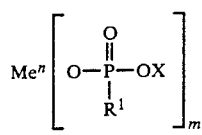

(II)

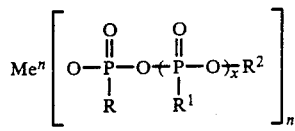

(III)

in which in each case
Me represents a metal,
n represents the valency of the metal Me,
m represents n/2,
R, $R^1$ and $R^2$ each independently of one another represents an organic radical having 1 to 18 carbon atoms,
X represents hydrogen, ammonium, alkylammonium or one equivalent of a metal and
x represents zero or an integer from 1 to 20.

5. A foam of claim 4, in which
Me represents magnesium, calcium or aluminium,
R, $R^1$ and $R^2$ each independently of one another represent methyl, ethyl, propyl, butyl, cyclohexyl or phenyl,
X represents hydrogen, ammonium, sodium or potassium and
x represents zero.

6. A foam of claim 5, wherein R, $R^1$ and $R^2$ is methyl.

7. A foam of claim 1, in which fillers are added.

8. A foam of claim 1, in which expandable additives are used.

9. A foam of claim 8, which contains expandable graphites in amounts of from 5 to 95% by weight, relative to the total foam.

10. A process for the production of heat resistant foams, comprising heating a metal phosphonate or metal phosphonate precursor to temperatures of above 200° C.

11. A process of claim 10, comprising heating a metal phosphonate or metal phosphonate precursor together with fillers to temperatures of above 200° C.

12. A process of claim 10, comprising heating a metal phosphonate or a metal phosphonate precursor together with additives to temperatures of above 200° C.

* * * * *

UNITED STATES PATENT AND TRADEMARK OFFICE
CERTIFICATE OF CORRECTION

PATENT NO. : 5,053,148
DATED : October 1, 1991
INVENTOR(S) : Wulf von Bonin

It is certified that error appears in the above-indentified patent and that said Letters Patent is hereby corrected as shown below:

Col. 12, line 5    Delete " 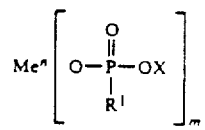 " and substitute

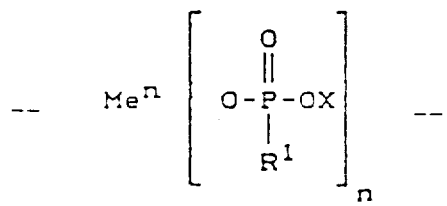

Signed and Sealed this

Tenth Day of August, 1993

Attest:

MICHAEL K. KIRK

*Attesting Officer*     *Acting Commissioner of Patents and Trademarks*